I. E. HINDMAN.

LIFTING JACK.

APPLICATION FILED MAY 24, 1916.

Reissued Dec. 26, 1916.

14,235.

2 SHEETS—SHEET 1.

WITNESSES

R. A. Balderson

Jesse B. Heller

INVENTOR

I. E. Hindman by Bakewell, Byrne & Parmelee

Attys

I. E. HINDMAN.

LIFTING JACK.

APPLICATION FILED MAY 24, 1916.

Reissued Dec. 26, 1916.

14,235.

2 SHEETS—SHEET 2.

WITNESSES

R. A. Balderson

Jesse B. Heller

INVENTOR

I. E. Hindman by Bakewell, Byne & Parmelee

Attys.

UNITED STATES PATENT OFFICE.

ISAIAH E. HINDMAN, OF CRAFTON, PENNSYLVANIA, ASSIGNOR TO THE DUFF MANUFACTURING COMPANY, OF PITTSBURGH, PENNSYLVANIA, A CORPORATION OF PENNSYLVANIA.

LIFTING-JACK.

14,235. Specification of Reissued Letters Patent. Reissued Dec. 26, 1916.

Original No. 1,052,921, dated February 11, 1913, Serial No. 719,018, filed September 6, 1912. Application for reissue filed May 24, 1916. Serial No. 99,704.

*To all whom it may concern:*

Be it known that I, ISAIAH E. HINDMAN, a resident of Crafton, in the county of Allegheny and State of Pennsylvania, have invented a new and useful Improvement in Lifting-Jacks, of which the following is a full, clear, and exact description, reference being had to the accompanying drawings, forming part of this specification, in which—

Figure 1:
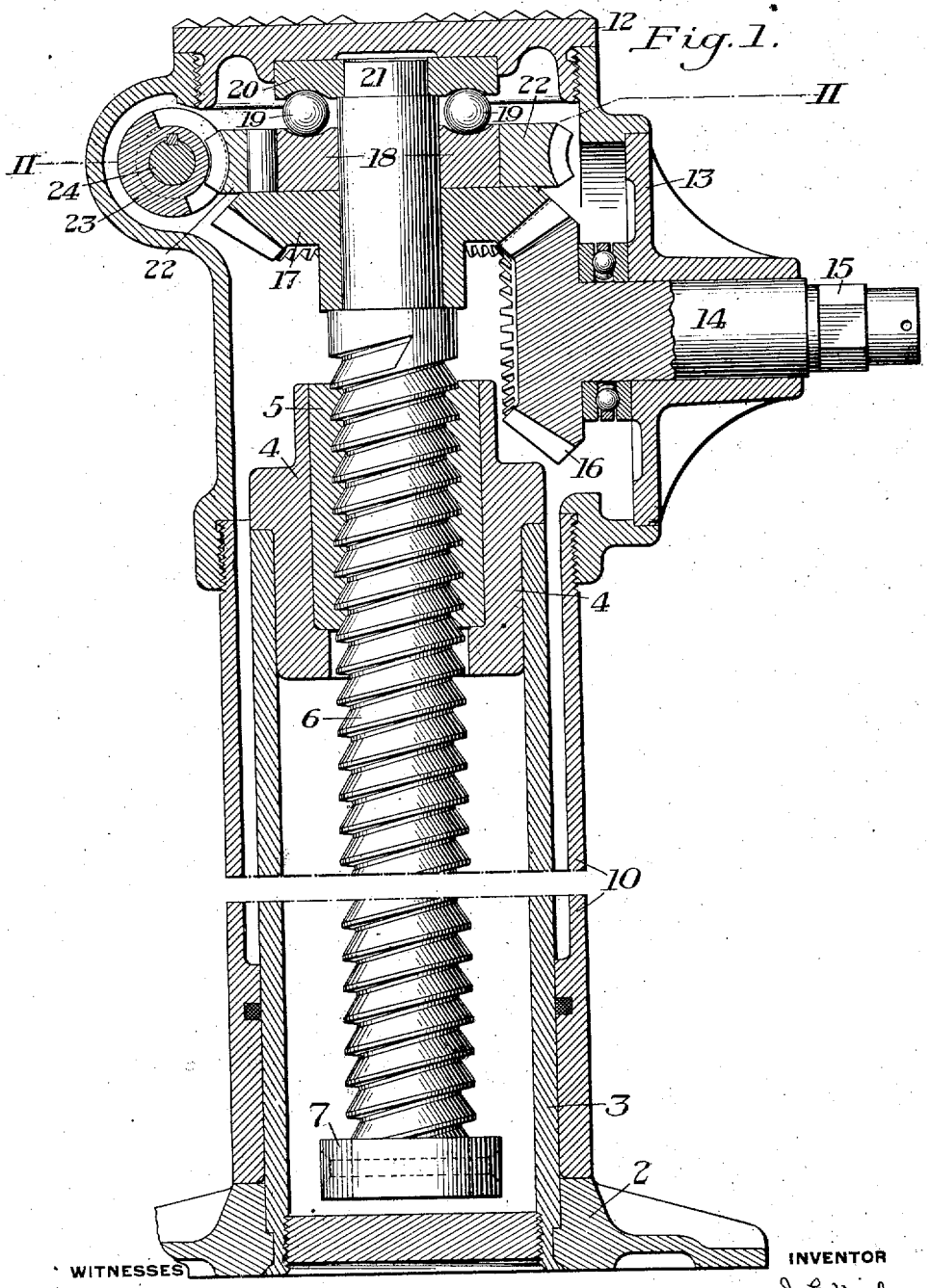
Figure 2:
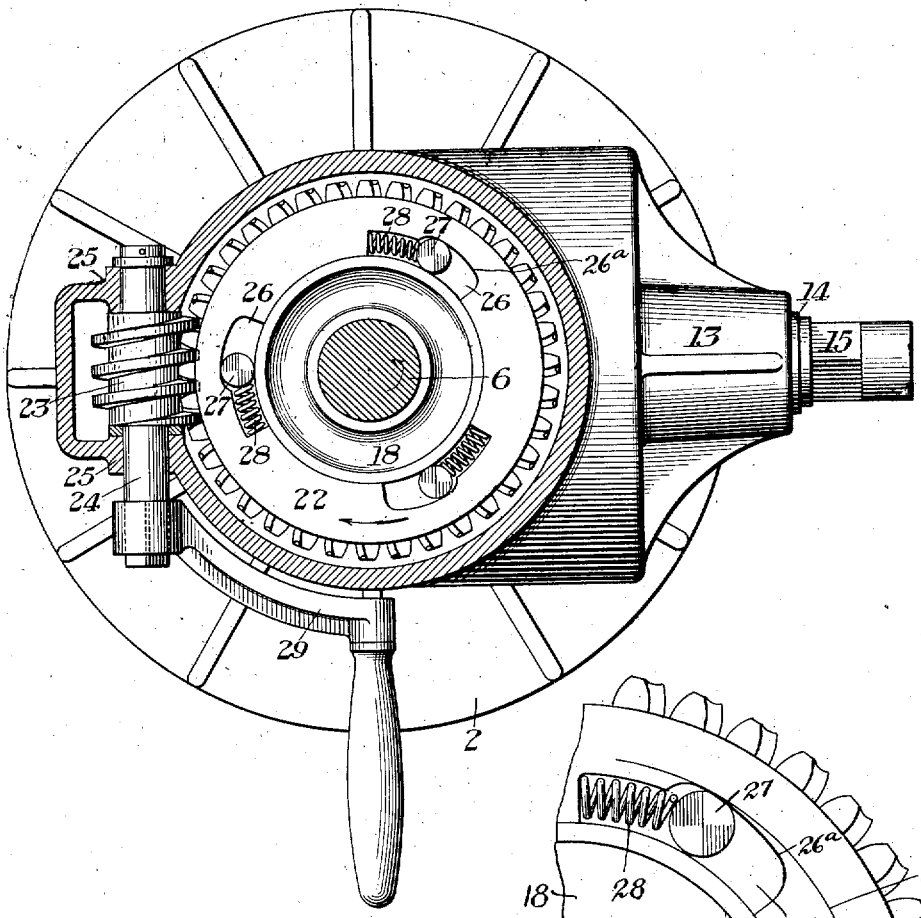
Figure 3:
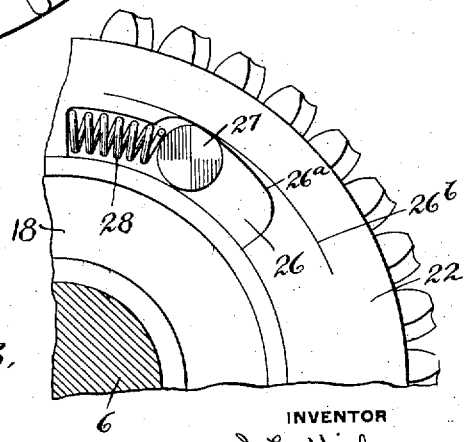

Figure 1 is a vertical longitudinal section through one form of jack having one form of my improvement attached thereto; Fig. 2 is a sectional view on the line II—II of Fig. 1, Fig. 3 is a detail view of portions of the clutch mechanism on a larger scale, and in which the angle of the wall of the slot which forms the cam has been exaggerated.

My invention has relation to lifting jacks, and is more particularly applicable to jacks in which it is desired to rapidly lower the jack under the weight of the load.

The invention is designed to provide a simple and efficient clutch mechanism by the action of which the load can readily be lowered without shifting or adjusting any of the various parts.

The precise nature of my invention will be best understood by reference to the accompanying drawings, which will now be described, it being premised, however, that various changes may be made in the details of construction and general arrangement of the parts, without departing from the spirit and scope of my invention as defined in the appended claims.

In the accompanying drawings, I have shown the invention as applied to a high speed screw jack, in which the numeral 2 designates the base of the jack having an upwardly projecting cylinder 3 provided with a head 4 having a central nut 5. The quick pitch screw stem 6 extends down through the nut and has secured to its lower end a head 7 which is adapted to limit the upward movement of the screw 6. Surrounding the cylinder 3 is a lifting shell 10, which carries at its top a lifting plate 12. Extending through a bearing 13 in the side of the shell is an operating stub shaft 14 having a squared outer end 15 and carrying within the shell a bevel gear 16 intermeshing with a horizontal bevel gear 17, which is keyed to the thread shaft 6. Surrounding the shaft 6 above the bevel gear 17 is a steel ring and ball race 18, which is also secured to the shaft 6 to rotate therewith. The upper face of the ring 18 is provided with an annular groove to receive a row of balls 19, which are also seated in an annular groove in the upper ball bearing plate 20, which is centered on the reduced portion 21 of the elevating screw 6.

Rotatably mounted on the upper face of the bevel gear 17 and surrounding the steel ring 18, is a worm wheel 22, which engages the threads of a worm 23 keyed to a shaft 24, which is journaled in bearings 25 formed in a lateral extension on the shell 10. The inner periphery of the worm wheel 22 is provided with a plurality of cam-shaped grooves or recess 26, in which are seated rollers 27, which engage the eccentric cam faces $26^a$ and the periphery of the ring 18. The cam faces $26^a$ are eccentric to the periphery of the ring 18, as well as the line $26^b$ which is concentric to the periphery of the ring 18, as clearly shown on Fig. 3 in which the angle of the cam face $26^a$ has been slightly exaggerated.

28 designates springs, which are seated in recesses adjacent to the cam recesses 26, and are arranged to engage the wall of said recesses and their respective rollers to hold the rollers toward the narrow portion of the cam recesses 25, so as to lock the worm wheel 22 with the ring 18 when the worm wheel is moved in one direction.

Secured to one of the ends of the shaft 24 is a crank 29 adapted to rotate the shaft 24 and worm 23 when the screw is lowered.

The operation of the device is as follows:—The jack is placed under the load and the screw 6 is elevated by means of the bevel gears 16 and 17 in the usual manner, without rotating the worm 22. The frictional engagement of the rollers 27 between the cam surfaces 26 and the ring 18 will prevent the rearward movement of the screw during the lifting of the load, as the worm will prevent the rotation of the worm wheel. When it is desired to lower the jack with its load, the crank 29 is rotated, which will rotate the worm wheel in the direction indicated by the arrow, and permit the rotation of the screw 6 under the action of the load to lower the same.

The advantages of my invention result from the provision of a worm and worm wheel connection for lowering the load of a screw jack, in which the downward movement of the screw is prevented by a worm and worm wheel.

A further advantage results from the provision of an automatic clutch which will permit the screw to be rotated to elevate the jack without rotating the worm wheel and which automatically locks the screw to the worm wheel when the raising mechanism is released.

I claim:

1. A lifting jack having an elevating screw, means for actuating said screw to elevate it, an automatic clutch for preventing the rotation of the screw in one direction, and means for rotating the clutch to permit the screw to move downwardly under the action of the load; substantially as described.

2. A lifting jack having an elevating screw, beveled gears for rotating the screw to elevate it, a worm and worm wheel connection with said screw, and an automatic clutch connection between the worm wheel and the screw for preventing the rotation of the screw in one direction relative to the worm wheel but which will permit free movement of the screw relative to the worm wheel in the other direction; substantially as described.

3. A lifting jack having an elevating screw, gearing for rotating the screw to elevate it, a worm wheel, a clutch connection between said worm wheel and the screw arranged to prevent the screw from rotating relative to the worm wheel under the action of the load, a worm engaging said worm wheel and normally preventing rotation thereof, and means for actuating said worm to rotate the worm wheel; substantially as described.

4. A lifting jack having a lifting screw, two independent sets of mechanisms connected to the screw, one of said sets of mechanisms including an automatic clutch to prevent the screw from rotating in one direction and to permit free rotation of the screw in the other direction by the other mechanism; substantially as described.

5. A lifting jack having an elevating screw, means for rotating said screw to elevate it, a rotatable, but normally stationary clutch connected to said screw and arranged to permit the screw to rotate in a direction to elevate it but to prevent it from rotating in the opposite direction, and means to rotate said clutch to permit the screw to rotate it in said opposite direction to lower it lower; substantially as described.

In testimony whereof, I have hereunto set my hand this 22nd day of May, 1916.

ISAIAH E. HINDMAN.

Witnesses:

Geo. B. Bleming,
Amy Reynolds.